Figure 1A:
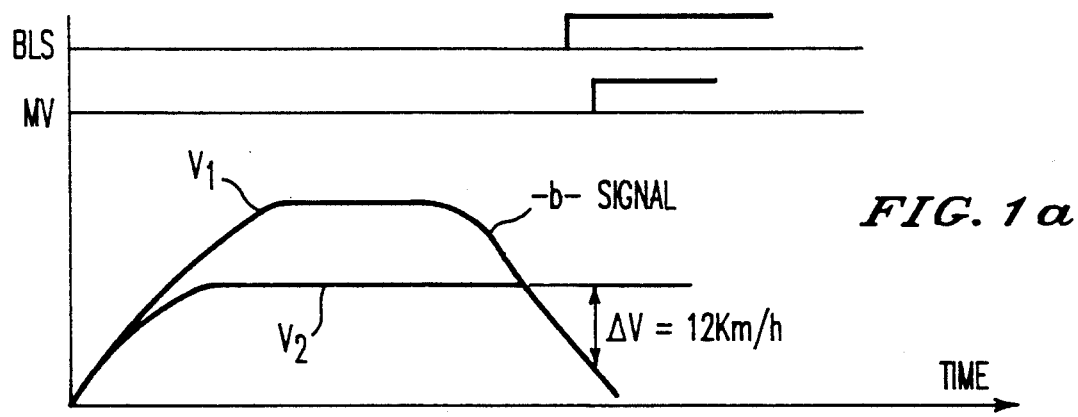

United States Patent [19]

Schmitt et al.

[11] Patent Number: 5,188,432
[45] Date of Patent: Feb. 23, 1993

[54] METHOD OF REGULATING THE BRAKING PRESSURE IN AN ANTILOCK VEHICLE BRAKE SYSTEM

[75] Inventors: Hubert Schmitt, Ochtendung; Wolfgang Kampemann, Moselkern, both of Fed. Rep. of Germany

[73] Assignee: Lucas Industries public limited company, Birmingham, England

[21] Appl. No.: 499,254
[22] PCT Filed: Oct. 12, 1989
[86] PCT No.: PCT/EP89/01204
  § 371 Date: Jun. 5, 1990
  § 102(e) Date: Jun. 5, 1990
[87] PCT Pub. No.: WO90/03904
  PCT Pub. Date: Apr. 19, 1990

[30] Foreign Application Priority Data

Oct. 14, 1988 [DE] Fed. Rep. of Germany ....... 3835095

[51] Int. Cl.$^5$ ............................................. B60T 8/82
[52] U.S. Cl. ...................................... 303/96; 303/103; 303/111; 364/426.02
[58] Field of Search ................ 303/105, 113, 106, 100, 303/107, 94, 108, 103, 111, 95, 46; 364/426.02

[56] References Cited

U.S. PATENT DOCUMENTS

| | | |
|---|---|---|
| 3,756,663 | 9/1973 | Fink . |
| 3,827,760 | 8/1974 | Fleagle .................. 303/106 |
| 4,154,487 | 5/1979 | Vannini et al. ........... 303/106 |
| 4,637,664 | 1/1987 | Arikawa ............ 303/113 AP X |
| 4,755,945 | 7/1988 | Kade et al. ............ 303/100 X |
| 4,758,053 | 7/1988 | Yosano ................ 303/100 X |
| 4,844,556 | 6/1989 | Fennel et al. ............ 303/100 |
| 4,881,785 | 11/1989 | Ushijima et al. ........... 303/111 |
| 4,902,076 | 2/1990 | Ushijima et al. ........... 303/100 |
| 4,917,444 | 4/1990 | Ishido et al. ............ 303/100 |

FOREIGN PATENT DOCUMENTS 2374181 7/1978 France .

Primary Examiner—Robert J. Oberleitner
Assistant Examiner—Lee W. Young
Attorney, Agent, or Firm—Oblon, Spivak, McClelland, Maier & Neustadt

[57] ABSTRACT

In a method of regulating the braking pressure in an antilock brake system it is provided that the rotational velocity of a wheel is compared with the rotational velocity of another wheel on the other vehicle side. When the rotational or angular deceleration of the one wheel exceeds a predetermined value, indicating a tendency to lock, but its rotational velocity is greater than that of the wheel on the other vehicle side, reduction of the braking pressure in an antilock regulation does not yet take place. This avoids wasting braking distance when negotiating a curve. It is only when thereafter the rotational velocity of the one wheel is a predetermined differential amount smaller than that of the other wheel that the braking pressure at the one wheel is lowered in conventional manner.

4 Claims, 2 Drawing Sheets

METHOD OF REGULATING THE BRAKING PRESSURE IN AN ANTILOCK VEHICLE BRAKE SYSTEM

The invention relates to a method of regulating the braking pressure in an antilock vehicle brake system in which the rotational behaviour of a braked wheel is measured and in dependence upon its slip and/or its angular retardation on exceeding at least one predetermined threshold value the braking pressure is normally lowered and later then increased again.

In antilock vehicle brake systems the rotation of the individual wheels of the vehicle is continuously monitored and in particular the slip of the braked wheels and their deceleration determined to detect a locking tendency of the wheel and prevent the locking. As soon as the wheel slip or the deceleration indicates a tendency to lock, which is determined by specific predetermined threshold values of slip and/or deceleration being exceeded, a further rise in the pressure in the brake of the affected wheel is stopped or the braking pressure diminished.

In particular, in the motor vehicle the wheel velocities of the driven wheels are measured and by differentiation of said velocity the wheel acceleration or deceleration is determined in each case for a single wheel. With the aid of the rotational velocity measured a so-called vehicle reference velocity is formed. If the rotational velocity of a wheel differs greatly from the reference velocity (so-called negative slip) or if the wheel reaches angular decelerations which are appreciably greater than the maximum physically possible vehicle deceleration (i.e. the deceleration which can be obtained with optimum braking, optimum tires and favourable road surface), the braking pressure at the affected wheel is decreased (usually by opening a magnetic valve) until the wheel again undergoes an acceleration lying above a predetermined threshold value.

The invention proceeds from this prior art. The underlying principles of the structure and function of antilock vehicle brake systems may be presumed known and are described for example in "BOSCH TECHNISCHE BERICHTE", vol. 7, 1980, No. 2, p. 65 to 94. In FIG. 20 therein an antilock system is described in which the rotational velocity of a wheel is measured. The pressure reduction does not start when an angular deceleration threshold is exceeded but only when the angular velocity of the wheel has decreased by a predetermined amount. This is an individual wheel control.

It is also known to connect the control passages of two wheels together, see DE 27 57 911 A1, where under critical driving conditions switchover takes place from an individual wheel control to a "select low" mode common to two wheels.

The antilock control of the braking pressure is concerned primarily with causing the peripheral velocity of the braked wheels to run as far as possible in the optimum range of the known adhesion coefficient/slip curve through all control cycles of a braking.

It has already been recognized in the prior art that for optimum regulation of the braking pressure adaptation of the threshold value to various conditions of the road surface/wheel system is necessary. Thus, for example, in DE-OS 3,345,729 account is taken of the fact that under certain conditions braked wheels may exhibit a rotational behaviour indicating pronounced angular deceleration although the wheel is still in a well brakable state. Such rotational or angular decelerations may occur in particular due to axle oscillations and simulate unstable running of the wheel and therefore initiate undesirable control operations, i.e. an undesired diminishing of the braking pressure. For this reason, in the prior art to suppress such undesired control operations the threshold value decisive for initiating the control is varied after a first control cycle in dependence upon the run-up acceleration of the controlled wheel.

Decisive for the shortest braking distance achievable on braking whilst maintaining steering stability of the vehicle is the adhesion coefficient $\mu$ between the road surface and the tire of the braked wheel. For this reason, the adhesion coefficient is also frequently referred to in the literature as "braking force coefficient". The adhesion coefficient $\mu$, as a function of the braking slip, apart from depending on many parameters, in particular the tire design, the tire profile, the contact force and the tire pressure depends essentially also on the nature of the road surface (whether dry, wet or icy).

With an undisturbed straight travel of the vehicle the rotational velocities of the wheels arranged on the left and right in the travelling direction are equal and correspond to the reference velocity If however the vehicle is steered into a curve the outer wheel in the curve, due to the wheel spacing, has a higher velocity than the wheel on the inside of the curve because it must cover a greater distance per unit time. Depending on the radius of curvature of the curve and the velocity of the vehicle however a wheel on the inside of the curve is relieved, i.e. the contact force of a wheel on the inside of the curve is substantially less than that of a wheel on the outside of the curve. Consequently, the braking force which can be transmitted on braking is reduced for the wheel on the inside of the curve. For the same reasons the transmittable drive force at the wheel on the inside of the curve on starting the vehicle also changes.

If the driver accelerates when negotiating such a curve, due to the relieving spinning of a wheel on the inside of the curve may occur so that the wheel on the inside of the curve can assume a higher rotational velocity than a wheel on the outside of the curve. This situation can occur in particular when the driver has to suddenly avoid an obstruction.

If the driver brakes immediately after the spinning of the wheel on the inside of the curve then firstly, on changing the foot from the acclerator to the brake, the rotational velocity of the wheel on the inside of the curve drops to the rotational velocity corresponding to the radius of the curve and the vehicle velocity. In other words, a pronounced angular deceleration of the wheel on the inside of the curve occurs. This is assessed by the antilock control system as a locking tendency of said wheel and said system therefore generates pressure diminishing signals. These pressure diminishing signals start however much too early because the wheel is not yet in a braking slip. Due to the pressure reduction the wheel on the inside of the curve will continue to rotate with a relatively high rotational velocity and will also not undergo any appreciable reacceleration so that pressure diminishing signals will continue to be generated with regard to said wheel.

In antilock systems, as preferably also in the present invention, it is provided that at the start of an antilock control by means of a suitable throttle valve the pressure rise gradient (i.e. the slope of the pressure rise at the brake cylinder depending on the pressure in the master cylinder) is switched to a shallow value. In other words, in a control operation the braking pressure in the brake cylinder rises with a smaller gradient than in the normal case, without antilock control. This flattening of the pressure rise gradient in antilock control systems is made to prevent "overshooting" of the braking pressure beyond the optimum value and achieve as close as possible an adaptation of the actual braking pressure profile to the ideal braking pressure profile. These relationships are known to the expert and need not be further explained here.

This flattening of the pressure rise gradient at the start of an antilock control leads in the negotiation of a curve as described above, if the vehicle is equipped with a two-channel brake system, to a so-called underbraking of the vehicle (i.e. braking distance is wasted) because the braking pressure is lowered not only at the relieved front wheel on the inside of the curve but also at the loaded rear wheel on the outside of the curve.

In two-channel-ABS-controllers which during a control operation in the controlled brake channel switch to a flatter pressure rise gradient, it is necessary in the event of one-sided instability (i.e. one wheel on one side of the vehicle reaches slip or angular deceleration indicating a tendency to lock), for example when braking on different adhesion coefficients (e.g. one vehicle side on water or ice and the other vehicle side on good road surface), to switch the other (uncontrolled) brake channel to a flat pressure rise gradient as well to avoid greatly different braking torques arising suddenly on the left and right side of the vehicle, which would cause a so-called yawing moment so that the vehicle could turn about the vertical axis.

In the aforementioned braking situation in a curve, due to the changeover to a flat pressure rise gradient a still greater underbraking of the vehicle could occur in the brake channel not exhibiting any tendency to lock as well because all the brakes would be subjected to the pressure buildup.

As a result, in an antilock system according to the prior art when negotiating a curve considerable braking distance can be wasted by a braking pressure reduction taking place too early at a wheel on the inside of the curve.

The invention is aimed at remedying this. It is thus based on the problem of providing a method of controlling the braking pressure in an antilock system which even when negotiating an extreme curve with possibly spinning wheels on the inside of the curve ensures the shortest possible stopping distance.

The solution of this problem according to the invention is characterized in claim 1.

It is thus firstly provided according to the invention that the rotational velocity of a wheel (which means here the wheel in question on the inside of the curve) is compared with the rotational velocity of another wheel on the other side of the vehicle. From this comparison, additional conditions for the antilock control are obtained going beyond the prior art. It is obvious that the "one wheel" may be any wheel of the vehicle. The control algorithm according to the invention provides that when a wheel exceeds a predetermined threshold value as regards the angular deceleration under at least one predefined condition resulting from the comparison of the left and right vehicle wheels contrary to the normal case the braking pressure is not yet reduced. In this connection it is determined whether the rotational velocity of the wheel observed is greater than that of a wheel arranged on the other side of the vehicle. If this is the case and at the same time the compared other wheel is rotating with an angular deceleration which still lies beneath the threshold value (i.e. is not exhibiting any tendency to lock) a reduction of the braking pressure at the other wheel doe not yet take place. Information corresponding to this operation is however stored. The method according to the invention thus takes account of the chronology of the events.

According to the invention it is further provided that at the braked wheel a pressure reduction is initiated only if at least two conditions are fulfilled, i.e. firstly the angular decleration of the wheel concerned must lie above the predetermined threshold value and secondly its rotational velocity must be smaller at least by a predetermined differential amount than that of another wheel arranged on the other vehicle side. It is however presumed here that this other wheel is still running in a stable state, i.e. exhibiting no tendency to lock. As soon as the other wheel exhibits a tendency to lock, i.e. its angular deceleration exceeds the predetermined threshold value, the additional condition for pressure reduction at the one wheel is cancelled, i.e. the one wheel (like the other) is antilock controlled in conventional manner.

With the solution described above however only spinning phenomena during curve negotiation are detected in which the wheel on the inside of the curve rotates faster than the wheel on the outside of the curve. It is however also possible that the spinning phenomenon is not so extreme and the wheel on the inside of the curve is accelerated only up to the rotational velocity of the compared wheel on the outside of the curve but not beyond said velocity.

In such a case the invention provides another algorithm for the antilock control. This variant is set forth in claim 2. An amplification thereof will be found in claim 3.

It is obvious that the solutions described in claims 1 and 2 can preferably be combined with each other to obtain optimum results.

Figure 1B:
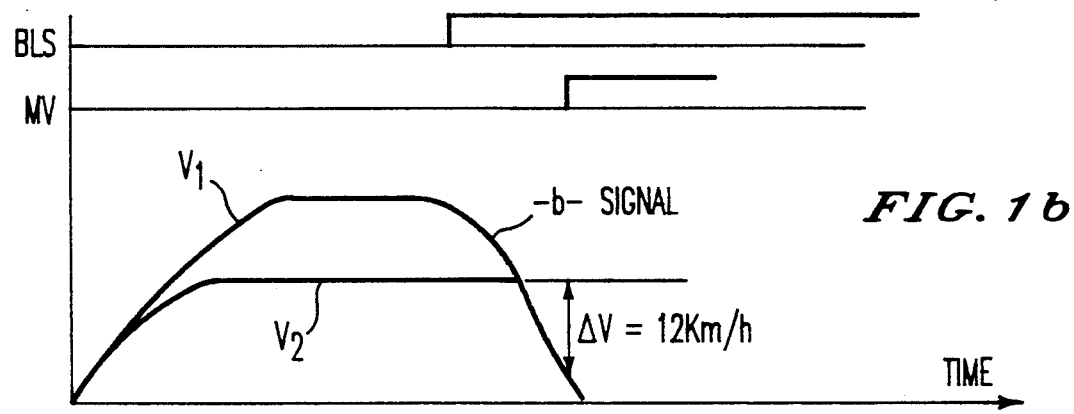
Figure 1C:
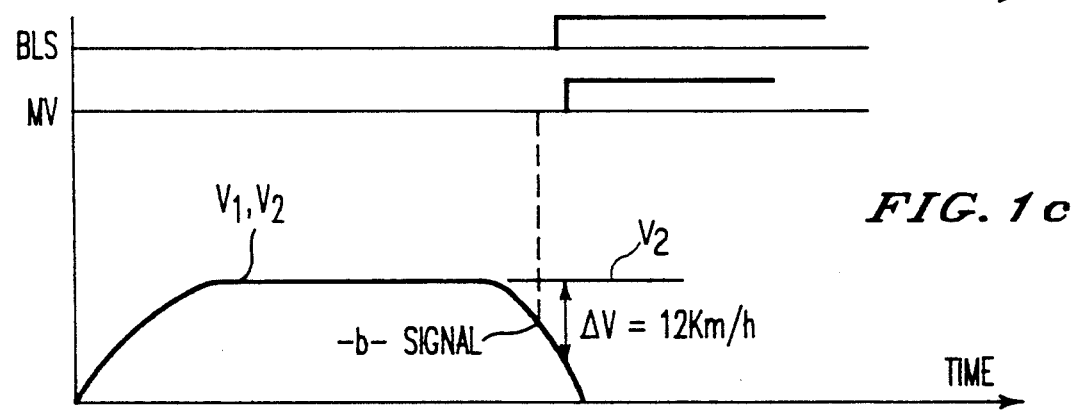
Figure 1D:
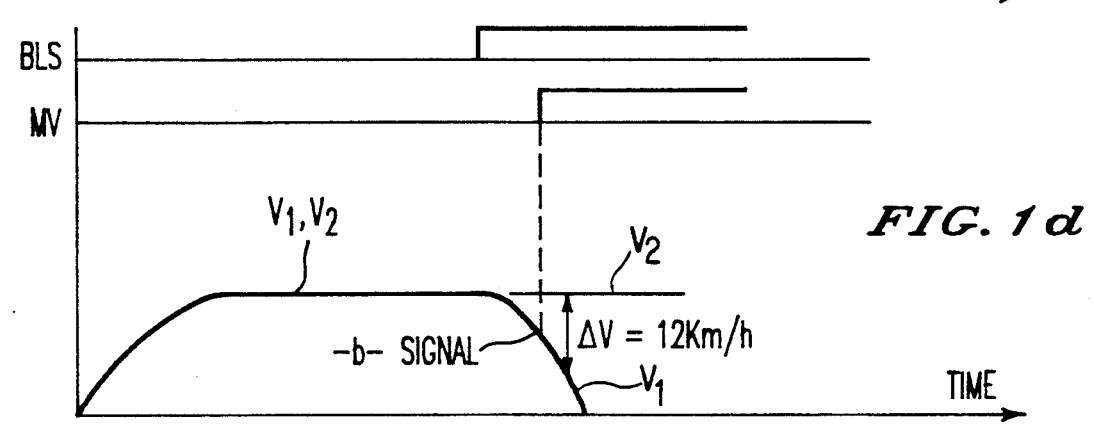
Figure 2:
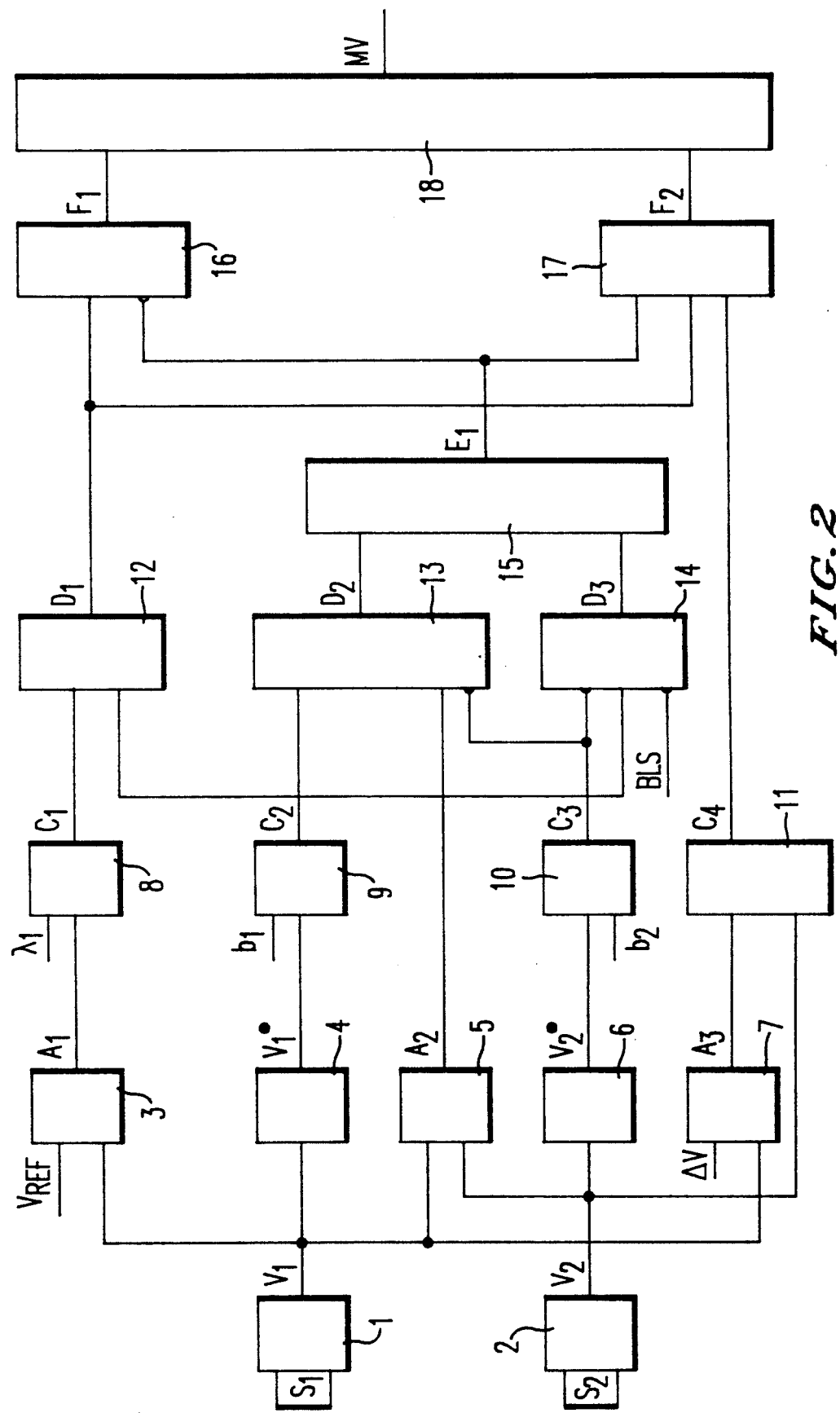

Hereinafter the invention will be explained in more detail with reference to the drawings, wherein:

FIG. 1 shows schematically the profile of the rotational velocities of two wheels which are arranged on opposite vehicle sides and FIG. 2 shows a block circuit diagram of a circuit for implementing the control algorithm according to the invention.

In FIGS. 1a, b, c and d the rotational velocities $v_1$, $v_2$ of two wheels arranged on opposite vehicle sides are plotted over a common time ordinate. The profile of the rotational velocities indicates that the velocity $v_1$ is that of the wheel on the inside of the curve.

Furthermore, in FIGS. 1a, b, c and d a brake light switch signal "BLS" and a signal "MV" indicating opening of the magnetic valve are entered. The signal "BLS" stands for a brake actuation which may of course be determined other than via the brake light. In other words, when the signal "BLS" goes into the state different from 0 the brake is actuated. The signal "MV" indicates that a magnetic valve at the respective wheel is opened, i.e. a pressure reduction takes place in the course of an antilock regulation.

Furthermore, in FIGS. 1a, b, c and d the so-called "−b−signal" is plotted. This is the predetermined threshold value regarding the angular deceleration of the wheel.

FIGS. 1a and 1b show the case in which during curve negotiattion the wheel on the inside of the curve spins faster than the velocity of the wheel on the outside of the curve, i.e. the rotational velocity $v_1$ of the wheel on the inside appreciably exceeds the rotational velocity $v_2$ of the wheel on the outside of the curve, as is illustrated. FIGS. 1a and 1b differ only in that in FIG. 1a it is assumed that the brake actuation takes place appreciably later than in FIG. 1b, i.e. that the signal "BLS" starts in FIG. 1b before the instant at which the angular deceleration of the wheel on the inside of the curve (first derivative of the rotational velocity $v_1$) reaches the threshold $-b-$signal whilst in FIG. 1a the brake is not actuated until after this instant.

Since in both cases the rotational velocity $v_1$ of the wheel on the inside of the curve exceeds that of the wheel on the outside of the curve, the control algorithm in both cases is independent of the start of the brake light switch signal "BLS". The braking pressure at the wheel on the inside of the curve is not lowered at the instant at which the angular deceleration reaches the threshold values (this instant is denoted in the Figures as "$-b-$signal") but later, i.e. at the instant at which the rotational velocity $v_1$ of the wheel on the inside of the curve is smaller by a predetermined differential amount $\Delta v$ than the rotational velocity $v_2$ of the wheel on the outside of the curve. This is illustrated in FIG. 1. The velocity difference is for example assumed to be 12 km/h. When the wheel on the inside of the curve rotates slower than the wheel on the outside of the curve by this amount the braking pressure at the wheel on the inside of the curve will be diminished, i.e. the magnetic valve opened for pressure reduction. This is represented in the Figures by the signal "MV". It is assumed here that the wheel on the outside of the curve is still not showing any tendency to lock, i.e. the rotational deceleration threshold value has not yet been reached. In the Figures $v_2$ is shown accordingly.

The profile of the rotational velocities of the two wheels compared in FIGS. 1c and 1d indicates that the wheel on the inside of the curve does not spin beyond the rotational velocity of the wheel on the outside of the curve. It spins substantially only to such an extent that the rotational velocities $v_1$ and $v_2$ are substantially equal. In this case the control algorithm provided according to the invention distinguishes between various situations. If at the start of the angular deceleration the brake has not yet been actuated (FIG. 1c, where the signal "BLS" starts later) a pressure reduction does not take place when the rotational velocity $v_1$ of the wheel on the inside of the curve has reached the angular deceleration threshold value ("$-b-$signal"), but only later, that is when once again the rotational velocity $v_1$ of the wheel on the inside of the curve is smaller by the predetermined differential amount $\Delta v$ of for example 12 km/h than the rotational velocity $v_2$ of the wheel on the outside of the curve. If in contrast in accordance with FIG. 1d the brake is actuated already at the start of the angular deceleration of the wheel on the inside of the curve, i.e. the BLS signal has already started at this instant, activation of the magnetic valve takes place immediately on reaching the angular deceleration threshold $-b$. Thus, in conventional manner the magnetic valve will be opened immediately on reaching the threshold value without first waiting for the instant at which the wheel on the inside of the curve is rotating the predetermined differential amount slower than the other wheel.

FIG. 2 shows a block circuit diagram of an example of embodiment of an apparatus for implementing the control algorithm described above. It is obvious that the control can also be carried out with software.

In a processor, measuring signals of a wheel rotational velocity sensor known per se are converted to velocities $v_1$ and $v_2$. In this example the velocity $v_1$ represents the wheel velocity of the wheel on the inside of the curve and the velocity $v_2$ the velocity of the wheel on the outside of the curve.

The velocities thus determined are supplied to the differentiators 4 and 6 which form the wheel accelerations $v'_1$ and $v'_2$. In the comparator 5 the switching signal $A_2$ is formed when the velocity $v_1$ is greater than the velocity $v_2$.

In a subtractor 7 a differential velocity $\Delta v$ corresponding to the maximum possible curve slip is deducted from the velocity $v_1$. The velocity signal $A_3$ thus obtained is supplied together with the velocity $v_2$ to a comparator 11 and there generates the switching signal $C_4$ if the velocity $v_2$ is greater than $A_3$.

In a subtractor 3 the wheel slip $A_1$ is formed from the vehicle reference velocity and the wheel velocity $v_1$. In a comparator 8 this slip signal $A_1$ is compared with a given threshold value $\gamma$ and then a switching signal $C_1$ generated if the threshold value is reached by the slip signal.

The switching signal $C_1$ and the switching signal $C_2$, signaling exceeding of an acceleration threshold value, form the switching signal $D_1$ via the OR stage 12.

The switching signals $C_2$, $A_2$ and negated $C_3$ are entered into an AND gate 13. In a second AND gate the switching signals $C_2$ and the negated $C_3$ are entered and form together with the negated brake light switch signal the switching signal $D_3$. The two outputs of said AND stages $D_2$ and $D_3$ form via the OR gate 15 the switching signal $E_1$. The OR gate 15 is constructed as storage member, i.e. has a storing effect. The switching signal $E_1$ is reset with a logic "1" by the signals MV or negated $C_2$ or $C_3$. The signal MV corresponds to activation of the magnetic valve.

In the AND stage 16 the switching signal $F_1$ is generated when the switching signal $D_1$ lies at logic "1" level and $E_1$ at logic "0" level. Thus, with a logic "1" the switching signal $E_1$ blocks the normal activation but with said "1" enables another activation path via $F_2$ which is provided with the additional condition $C_4$. The switching signals $D_1$, $E_1$ and $C_4$ lead in the AND stage 17 to an output signal $F_2$. These two signals $F_1$ and $F_2$ form via the OR stage 18 the signal for activating the magnetic valve at the wheel on the inside of the curve.

We claim:

1. Method of regulating the braking pressure in an anti-lock vehicle brake system of the type in which during normal braking the rotational behavior of a wheel is measured and, in dependence upon its angular retardation exceeding at least one predetermined threshold value $(-b)$, the braking pressure of said wheel is automatically reduced and then increased, said method comprising:
   1) comparing the rotational velocity of one wheel on one side of a vehicle with another wheel on the other side of the vehicle;
   2) comparing the angular deceleration of said one wheel and said other wheel with said predetermined threshold value $(-b)$;
   3) storing the compared values of said velocities and decelerations;

4) preventing reduction of pressure in said one wheel when:
   a) the angular deceleration of said one wheel exceeds said predetermined threshold value (−b); and
   b) the angular deceleration of said other wheel is less than said predetermined threshold value (−b); and
   c) the rotational velocity of said one wheel is greater than that of said other wheel; and thereafter reducing the pressure in said one wheel when its rotational velocity has fallen to at least a predetermined amount ($\Delta v$) smaller than that of said other wheel.

2. A method according to claim 1, wherein said predetermined amount ($\Delta v$) corresponds to the maximum possible difference of the rotational velocities between said one and other wheels when negotiating a curve.

3. Method of regulating the braking pressure in an anti-lock vehicle brake system of the type in which during normal braking the rotational behavior of a wheel is measured and, in dependence upon its angular retardation exceeding at least one predetermined threshold value, the braking pressure of said wheel is automatically reduced and then increased, said method comprising:

1) prior to the application of brakes, allowing one wheel on one side of a vehicle to commence deceleration relative to another wheel on the other side of the vehicle;
2) comparing the velocities of said unbraked one and other wheels;
3) applying braking pressure to said one and other wheels;
4) preventing reduction of pressure in said one wheel even though its deceleration exceeds said threshold valve when:
   a) said one wheel prior to application of braking pressure had decelerated from a state in which its rotational velocity is not greater than that of the other; and
   b) after the application of braking pressure the angular deceleration of said other wheel is not in excess of said threshold value;

and thereafter reducing pressure in said one wheel when the rotational velocity thereof is at least a predetermined value ($\Delta v$) smaller than that of said other wheel.

4. A method according to claim 3, wherein said predetermined amount ($\Delta v$) corresponds to the maximum possible difference of the rotational velocities between said one and other wheels when negotiating a curve.

* * * * *